Dec. 28, 1954   A. C. CHAVIGNER   2,698,430
DEVICE FOR THE DETECTION OF LEAKS IN PRESSURIZED CABLES
Filed May 6, 1952   2 Sheets-Sheet 1
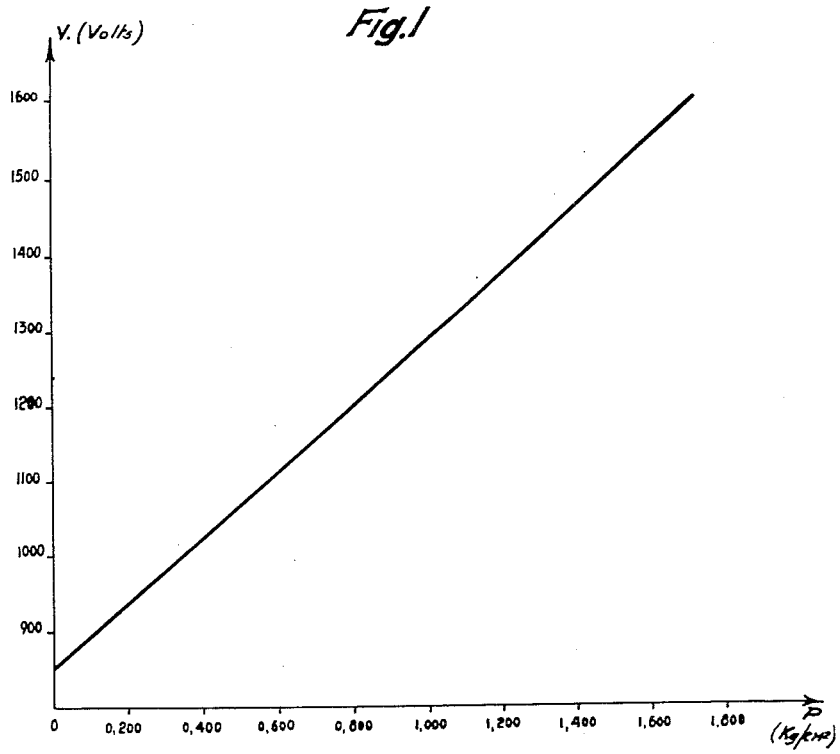
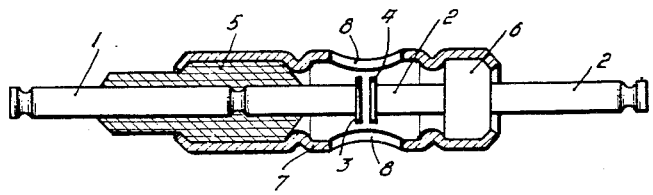
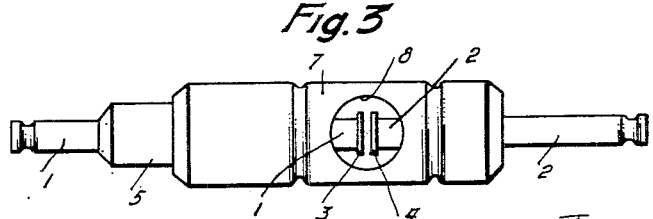
INVENTOR
ANDRE CHARLES CHAVIGNER
By:
Hazeltine, Lake & Co.
AGENTS Dec. 28, 1954   A. C. CHAVIGNER   2,698,430
DEVICE FOR THE DETECTION OF LEAKS IN PRESSURIZED CABLES
Filed May 6, 1952                          2 Sheets-Sheet 2
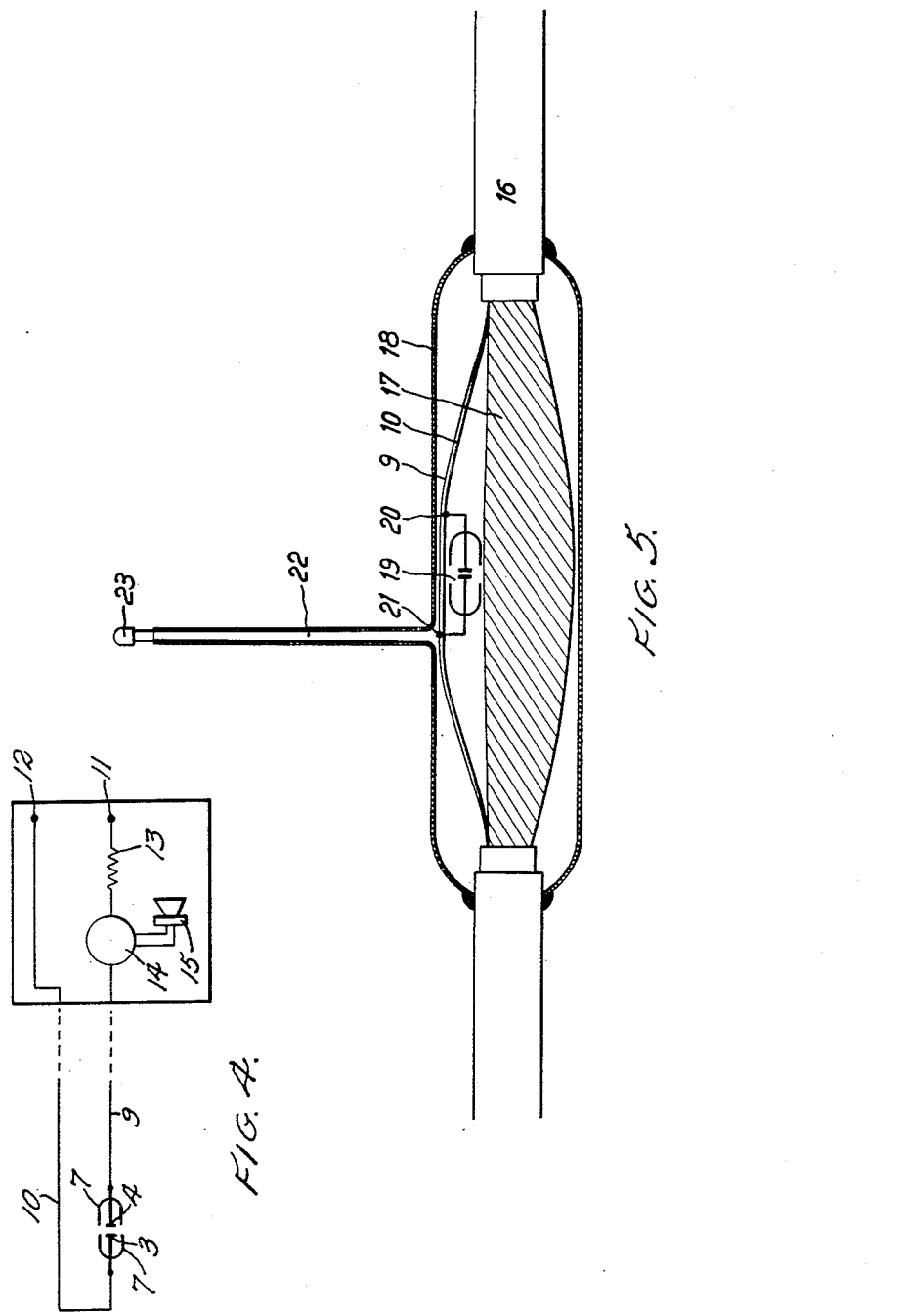

United States Patent Office 2,698,430
Patented Dec. 28, 1954

2,698,430

DEVICE FOR THE DETECTION OF LEAKS IN PRESSURIZED CABLES

André Charles Chavigner, Paris, France, assignor to Societe Alsacienne de Constructions Mecaniques, a corporation of France Application May 6, 1952, Serial No. 286,395

Claims priority, application France May 21, 1951

1 Claim. (Cl. 340—242)

The present invention relates to pressurized electric cables and more particularly to telecommunication cables comprising an outer sheath in which a gas, under pressure, is permanently injected for the purpose of avoiding any introduction of humidity, should the sheath develop a physical leak.

Should an opening accidentally happen to be formed in the sheath of such a cable, a leak is created, shown by a pressure drop which may jeopardize the desired result. It is advantageous, therefore, to be able to detect any pressure drop occurring in the cable.

It has already been proposed, to this effect, to place at certain intervals, over the length of the cables, manometric devices which, when actuated by the action of the pressure dropping below a predetermined value, would transmit an alarm signal to a supervision station, through the agency of an electrical contact inserted in an electric circuit set up along the route of the cable.

These devices, however, although reliable in operation, are fairly complex and consequently costly. In addition, their function being strictly confined to signalling that the pressure inside the cable has fallen below a predetermied limiting value, they do not make it possible to supply at will and at any moment, to the supervising station, information as to the actual pressure condition prevailing inside the cable.

The object of the present invention is a simple and economical device, having small dimensions and capable of being housed easily inside cables, in particular at the locations of connection splices of telephone cables. This device makes it possible, in addition, to obviate the above mentioned drawback by offering the possibility of being kept informed, at any moment, of the value of the pressure obtaining inside the cable.

The device according to the invention comprises, fundamentally, a spark gap arranged inside the cable sheath at the point where it is desired to check the pressure, and consisting of two electrodes associated with, but electrically isolated from each other, and mechanically connected by means which make it possible to adjust their mutual distance, said spark gap being connected, through an electric circuit, which may consist of one pair of conductors of the cable to be checked, to a high-voltage electric current source, with the interposition of a resistance limiting any discharge flow and of a measuring instrument, sensitive to the electric current, such as a galvanometric relay, the current source, the resistance and the measuring instrument being arranged preferably in a common control station.

A spark gap, such as mentioned above, may be arranged at each one of the points where it is desired to check the pressure inside a cable, for instance at the location of splices, which are generally placed in telephone cables at intervals of about 460 meters. An alarm signal mounted at the said control station may be associated, by any means known in the art, with the measuring instrument corresponding to each one of the spark gaps arranged in the cable.

As stated above, this device makes it possible to effect all pressure checking measurements and to be informed at will as to the pressure conditions obtaining inside the cable at the point where the spark gap is installed.

It is known that, in accordance with the well known Paschen's law, the break down voltage between two electrodes placed at a given distance depends on the pressure of the gas atmosphere in which these electrodes are placed, said voltage being all the higher as said pressure is itself higher.

Any pressure drop in the cable, at a point where a spark gap is located, will thus be shown by a lowering of the voltage necessary for causing the discharge spark between the electrodes of said spark gap and consequently for closing the circuit on which said spark gap is placed.

By applying a given voltage to the terminals of the circuit on which a spark gap has been inserted, the alarm signal associated with the measuring instrument will be actuated as soon as the pressure obtaining between the electrodes and the spark gap will fall below the value at which the voltage applied gives rise to a discharge current large enough to close the circuit in which the spark gap is connected. By modifying the voltage thus applied, one may vary at will the pressure threshold at which the discharge occurs, and consequently plot, from a distant checking station, a curve showing the variations of the pressure obtaining at each point where a spark gap is placed, without the necessity of exploring the route of the cable.

The invention will be described in greater detail hereinafter, with reference to the appended drawings whereinː

Figure 1 is a curve showing the variation of the disruptive voltage V between the two platinum plated electrodes of a spark gap placed at a distance of 0.5 mm. in dry air, against the pressure P; the latter is expressed in kilograms per square centimeter above the atmospheric pressure.

Figure 2 is a view in longitudinal section of an example of embodiment of a spark gap for carrying out the invention.

Figure 3 is a view in side elevation of the same spark gap.

Figure 4 is a diagram of the electric circuit in which the spark gap is inserted.

Figure 5 shows a gas pressurized cable, at a splicing point, in which there is provided, inside the splicing sleeve, a spark gap according to the invention.

As shown in Figures 2 and 3 the spark gap comprises two metal rods 1 and 2 terminated respectively by plane electrodes 3 and 4 arranged face to face. On the metal rods 1 and 2 are arranged insulating masses 5 and 6 offering cylindrical outer faces and on which has been spun a tube 7 of annealed copper, said tube being provided with apertures 8 at the level of the electrodes 3 and 4. The outer ends of the rods 1 and 2 are arranged as adaptors for their connection with electrical conductors.

To realize the device in accordance with the invention, the spark gap is connected, through conductors 9 and 10, which may consist of one pair of conductors of the cable in which it is desired to check the pressure, to a supervision station in which a high voltage may be applied to the ends 11 and 12 of the conductors 9 and 10, a resistance 13 and a galvanometric relay 14, to which an alarm device 15 is associated, being inserted in series on the conductor 9.

At a splicing point in a pressurized cable as represented on Figure 5, 17 designates spliced conductors and 18 a lead junction sleeve of the well-known type. The spark gap 19 is set up inside the sleeve and connected at 20 and 21 with the conductors 9 and 10 of a signalling circuit. In practice, there is often provided in the splice a valve 23 mounted at the end of a tube 22 allowing pressure inside the cable to be directly checked if desired.

From the curve shown in Figure 1, it will be seen that if, for instance, the normal excess pressure of the atmospheric flowing through the cable is 0.8 kg./cm.², the corresponding breakdown or disruptive voltage is 1200 volts. A pressure drop of 200 grams corresponds to a lowering of the breakdown voltage of 90 volts.

If there is applied at the points 11—12 a voltage of 1110 volts, while the excess pressure inside the cable, at the point where the spark gap considered is located, is higher than 0.600 kg./cm.², the discharge cannot take place between the electrodes 3 and 4 and no current passes in the circuit of Figure 4. If, due to a leak, this excess pressure falls below 0.600 kg./cm.² the discharge occurs between the electrodes 3 and 4, closing the circuit 11—9—10—12, the relay 14 operates and causes the triggering of the alarm signal 15.

By varying the voltage applied to the points 11 and 12 it is possible to determine the instantaneous value of the pressure at the point where the spark gap is located, the alarm signal being triggered by the relay 14 when said voltage reaches the value of the breakdown voltage corresponding to that pressure, a value which is shown by the curve of Figure 1, in case of a dry air filling.

It will be realized that it is thus possible, by periodic measurements, to check in a permanent manner the pressure at all points inside a cable.

The distance between the electrodes of the above described spark gap may be adjusted at will by crushing more or less the tube 7 in the longitudinal direction, for instance by means of a press.

It will be understood that this spark gap has been described merely by way of example and that a similar spark gap of any other type falls within the scope of the invention.

I claim:

Apparatus for detecting leaks in a gas pressurized electric cable, comprising, in combination, a high-voltage electric current source and a circuit fed from said source, said circuit including, in series connection, a resistance, an electric-current-indicating-instrument and a spark gap located inside the sheath of said cable, said spark gap including two electrodes, said electrodes being respectively set up at one end of each one of two rods, each of which is mounted through insulating means inside a common conducting envelope provided with apertures allowing said gas to flow between said electrodes and at least one of said rods being slidable inside said insulating means, whereby the distance between said electrodes may be adjusted.

References Cited in the file of this patent

UNITED STATES PATENTS

| Number | Name | Date |
| --- | --- | --- |
| 996,091 | Johnson | June 27, 1911 |
| 2,058,256 | Pike | Oct. 20, 1936 |
| 2,305,096 | McDermott | Dec. 15, 1942 |
| 2,520,624 | Davey | Aug. 29, 1950 |
| 2,523,017 | Harrison | Sept. 19, 1950 |
| 2,600,891 | MacNeille | June 17, 1952 |

FOREIGN PATENTS

| Number | Country | Date |
| --- | --- | --- |
| 355,630 | Great Britain | Aug. 27, 1931 |